(No Model.) 3 Sheets—Sheet 1.
G. P. MYERS.
BAND SAWING MACHINE.
No. 488,364. Patented Dec. 20, 1892.
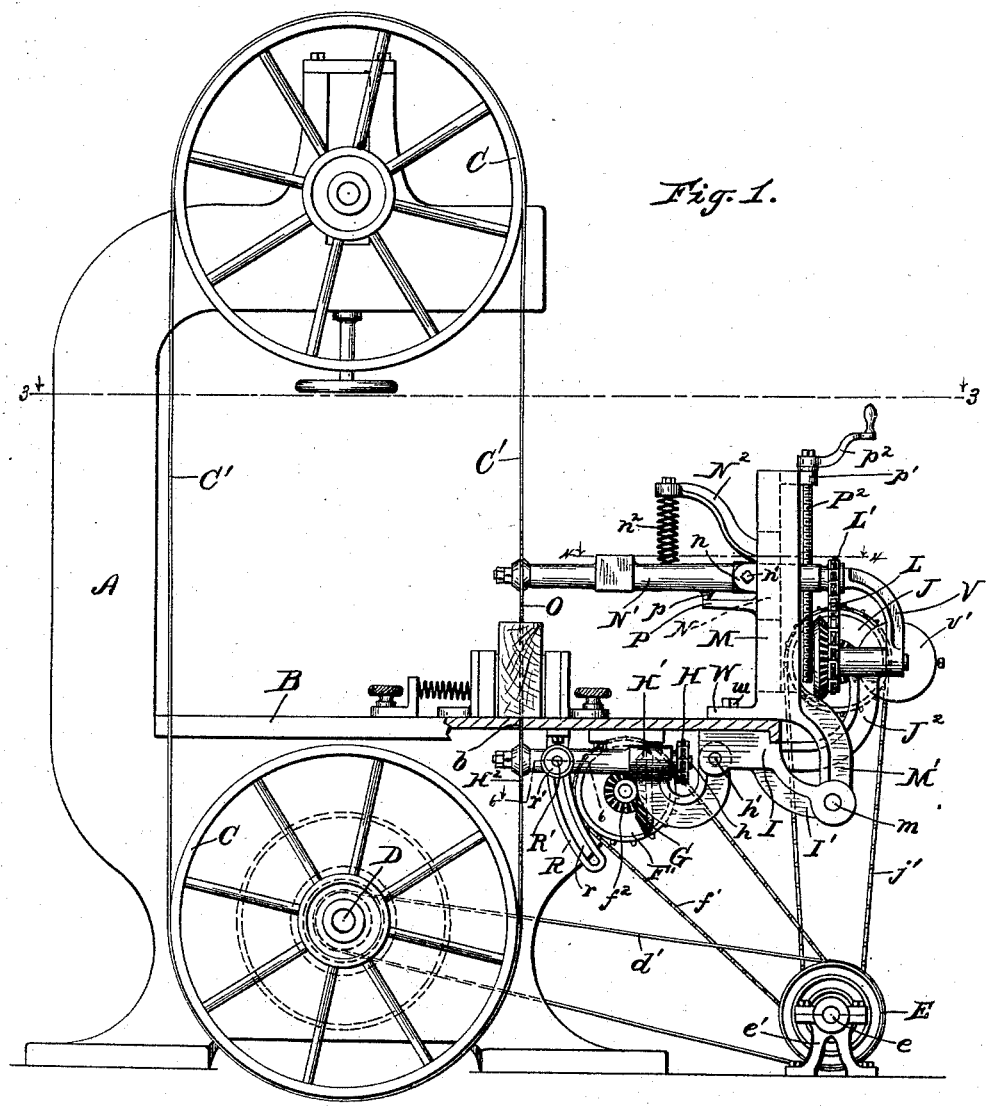
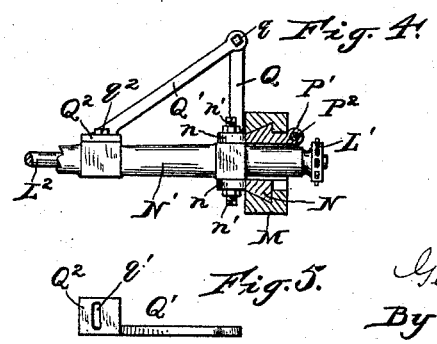
Witnesses,
John E. Wiles
N. E. Oliphant
Inventor,
George P. Myers,
By H. G. Underwood
Attorney.
THE NORRIS PETERS CO., PHOTO-LITHO., WASHINGTON, D. C.

(No Model.) 3 Sheets—Sheet 2.

G. P. MYERS.
BAND SAWING MACHINE.

No. 488,364. Patented Dec. 20, 1892.

Witnesses,
John E. Wiles.
N. E. Oliphant

Inventor.
George P. Myers
By H. G. Underwood
Attorney.

(No Model.)  3 Sheets—Sheet 3.

G. P. MYERS.
BAND SAWING MACHINE.

No. 488,364.  Patented Dec. 20, 1892.

Witnesses,
John E. Wiles
N. E. Oliphant

Inventor,
George P. Myers.
By H. G. Underwood
Attorney.

United States Patent Office.

GEORGE P. MYERS, OF SHEBOYGAN, WISCONSIN, ASSIGNOR OF ONE-HALF TO HENRY G. POTT, OF SAME PLACE.

BAND SAWING-MACHINE.

SPECIFICATION forming part of Letters Patent No. 488,364, dated December 20, 1892.

Application filed June 6, 1892. Serial No. 435,641. (No model.)

*To all whom it may concern:*

Be it known that I, GEORGE P. MYERS, a citizen of the United States, and a resident of Sheboygan, in the county of Sheboygan, and in the State of Wisconsin, have invented certain new and useful Improvements in Band Sawing-Machines; and I do hereby declare that the following is a full, clear, and exact description thereof.

My invention relates to new and useful improvements in band sawing machines, and relates more particularly to mechanism for feeding the work to the saw.

The invention consists in the matters hereinafter described and pointed out in the appended claims.

Figure 2:
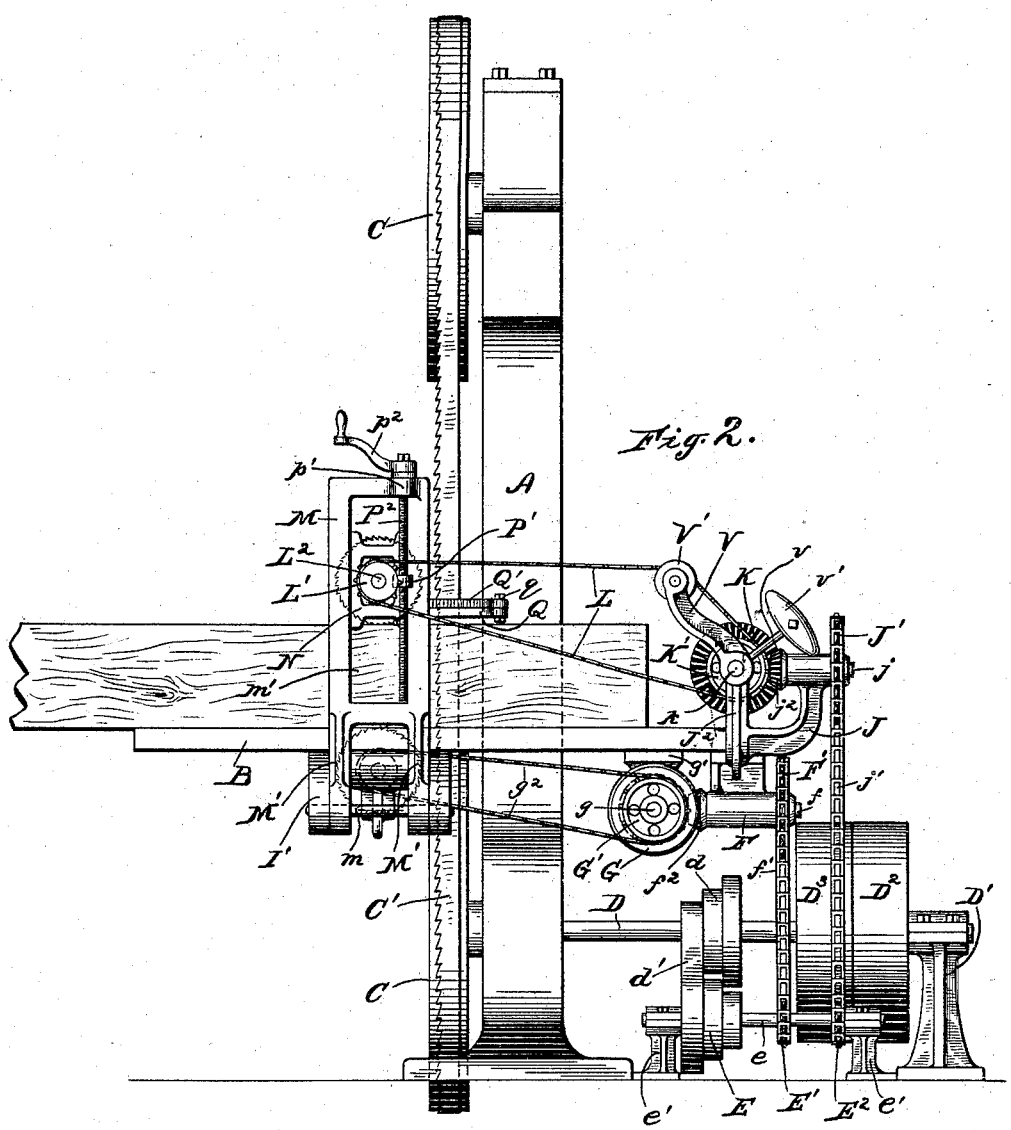
Figure 6:
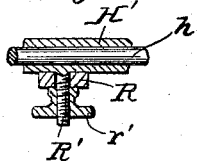
Figure 3:
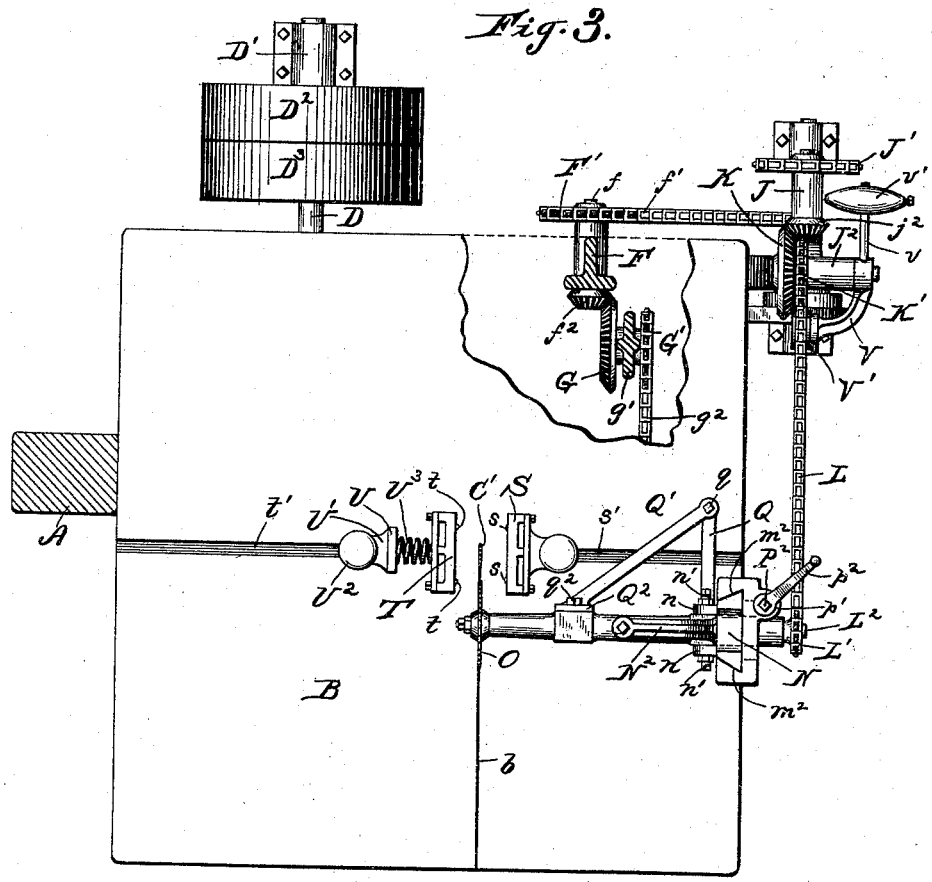
Figure 7:
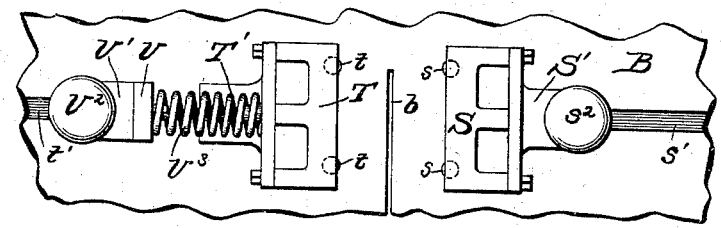
Figure 8:
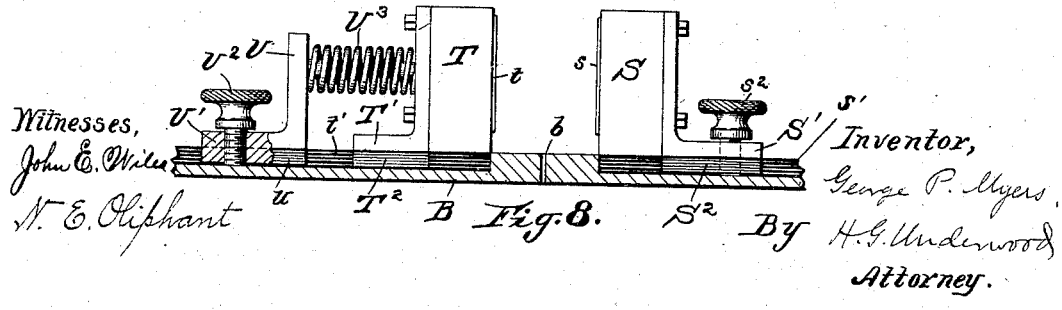

In the accompanying drawings illustrating my invention: Figure 1 is a front elevation of a band sawing machine provided with my improved feeding mechanism, and shows a portion of the saw table broken away to better illustrate the construction and arrangement of the parts. Fig. 2 is a side elevation of the machine, Fig. 3 is a horizontal sectional view of the same taken on line 3—3 of Fig. 1, Fig. 4 is a detail sectional view taken on line 4—4 of Fig. 1, Fig. 5 is a detail elevation of one of the parts shown in Fig. 4, Fig. 6 is a detail sectional view taken on line 6—6 of Fig. 1, Fig. 7 is an enlarged plan view of the guides for holding the work in position while being sawed, Fig. 8 is a side elevation of the same showing portions broken away to better illustrate the construction.

In said drawings:—A represents the standard and B the saw table of a band sawing machine of any desired construction, the standard A carrying the usual saw-carrying pulleys C C arranged above and below the table B, over which pulleys the saw C' is trained in a familiar manner, and the table B being provided with the usual slot $b$ extending from one side to the central part thereof for the introduction or removal of the saw C'. The lower wheel C is mounted upon a drive shaft D which extends through a suitable bearing in the standard A and is journaled at its other end in a pedestal D' and carries the usual tight and loose pulleys $D^2 D^3$. Upon the shaft D is secured a cone pulley $d$ consisting of any desired number of steps, and a belt $d'$ transmits motion from said cone pulley to a similar pulley E mounted upon a revoluble shaft $e$ which is journaled at its opposite ends upon suitable pedestals $e'$ $e'$. Sprocket pinions E' and $E^2$ are secured to the shaft $e$ and serve to transmit motion to the feeding apparatus which I will now proceed to describe.

A hanger F is secured below the saw table B and in a suitable bearing in the lower end of said hanger, is journaled a shaft $f$, upon one end of which is secured a sprocket gear F', to which motion is transmitted by a sprocket chain $f'$ trained over said gear and over the pinion E' on shaft $e$. Upon the other end of the shaft $f$ is secured a bevel pinion $f^2$ arranged to mesh with a bevel gear G which is mounted upon one end of a shaft $g$ journaled in a hanger $g'$ which depends from the saw table. Upon the other end of said shaft $g$, is secured a sprocket gear G' and a sprocket chain $g^2$ is trained over said gear G' and a sprocket pinion H which is mounted upon the end of a shaft $h$ journaled in a sleeve H', which is adjustably secured below the saw table, preferably by a pivotal connection $h'$ with a block I. Upon the free end of the shaft $h$ is secured a revoluble feeding disk $H^2$ having a notched or toothed periphery as shown. This feeding disk is arranged to normally extend upward through the slot $b$ in the saw table B in such a manner as to bring its toothed periphery into engagement with the under surface of a board or timber placed upon the saw table to advance the same by the rotation of said disk.

A bracket J is secured to the under side of the table and extends outwardly and upwardly past the side thereof, and is provided at its upper end with a bearing within which is journaled a shaft $j$, carrying upon one end, a sprocket gear J' operatively connected by a chain $j'$ with the pinion $E^2$ on the shaft $e$. Upon the other end of said shaft $j$, is secured a bevel pinion $j^2$ meshing with a bevel gear K which gear is mounted upon a shaft $k$ journaled in the upper end of an arm $J^2$ arising from the bracket J, and carrying at its other end, a sprocket gear K'. Arms I' I' extend outward from the block I which is secured to the under side of the saw table and to the outer ends of said arms are pivoted the lower ends of arms M' M' which extend downwardly from a standard M and serve as supports therefor, the pivotal connection between said arms I' I' and M' M' being conveniently formed by means of a rod $m$ passed therethrough.

The standard M is provided with a vertical slot $m'$ and with vertically disposed guides or ways $m^2$ $m^2$ between which a vertically movable head N is slidingly engaged. This head N is provided with two lateral ears $n\, n$, between which a sleeve N' is pivotally supported by means of stud bolts $n'$ $n'$ passed through said ears and engaged therewith. A shaft $L^2$ is journaled in said sleeve and carries at its outer end, a sprocket pinion L', and a sprocket chain is trained over said pinion L' and the sprocket gear K' and serves to transmit a rotary motion to the shaft $L^2$. Upon the other end of said shaft is provided a second rotary feeding disk O, adapted to engage with the upper surface of a board or timber which is being operated upon by the saw.

An arm $N^2$ extends from the head N above the sleeve N' and a spring $n^2$ is arranged between said arm and said sleeve in such a manner as to press said sleeve downward to hold the disk O in engagement with the work in the machine but to permit it to yield upwardly to accommodate any unevenness in the board or timber. A second arm P extends horizontally from the head N, below the sleeve N' and a lug $p$ is provided upon the under side of said sleeve and arranged to come against the upper side of the arm P when the sleeve N' is in a horizontal position, so as to serve as a stop to prevent any further downward movement of the said sleeve.

By reference to Figs. 1 and 3 of the drawings, it will be observed that the pinions $f^2$ and $j^2$ which drive the gears G and K are arranged upon opposite sides of the said gears, so that by their rotation in the same direction, they will transmit rotary motion to the said gears in opposite directions. By this construction therefore, the shafts $h$ and $L^2$ are caused to rotate in opposite directions and the disks $H^2$ and O caused to rotate in opposite directions, the adjacent portions of their peripheries being caused to travel in the same direction so as to give a uniform longitudinal feed to the work.

Upon the head N is provided an ear or lug P' and a screw $P^2$ is passed through an apertured lug $p'$ upon the upper end of the standard M and has a screw threaded engagement with the lug P' on the head. An operating handle $p^2$ is provided upon the upper end of the screw $P^2$. By means of this screw the head N may be adjusted vertically so as to raise or lower the sleeve N' and the feeding disk O to accommodate any desired thickness of lumber.

An arm Q is arranged to extend horizontally from the head N and an angular link or arm Q' is pivotally engaged at $q$ with its outer end, said angular arm being provided with an upturned end $Q^2$ provided with a slot $q'$ which movably engages with a bolt $q^2$ extending from the side of the sleeve N'. The slot $q'$ in the upturned end of the angular link or arm is formed upon an arc of a circle struck from the pivotal connection of the sleeve N' with the ears $n\, n$ on the head N, so as to permit of a vertical movement of the free end of the sleeve with the feeding disk but at the same time serving to support said sleeve against lateral strain.

As illustrated more particularly in Figs. 1 and 6, a slotted arm R formed upon the arc of a circle struck from the pivotal connection $h'$ of the sleeve H' with the block I, is arranged by the side of the free end of said sleeve, said slotted arm being suspended from the saw table B in any desired manner. A stud R' is arranged to extend from the side of said sleeve and projects through the slot $r$ in said arm, and a hand nut $r'$ is engaged therewith as shown. By this construction, the sleeve may be adjusted so as to bring the feeding disk into a position to engage with the lower side of the lumber upon the table B, and secured in its adjusted position, or by loosening the nut $r'$, the sleeve H may be permitted to drop downwardly so as to carry the disk $H^2$ out of the line of the slot $b$, to enable the band saw C' to be removed, or for the removal of the disk $H^2$.

Upon the table B, I provide adjustable guides between which the boards or timbers are passed, and for this purpose I prefer to employ the form of guides illustrated in Figs. 1, 3, and 7 and 8 of the drawings, in which, S and T represent guide blocks arranged to rest upon the top of the table B, their adjacent surfaces arranged vertically, and said blocks provided with vertically disposed anti-friction rollers $s\, s$ and $t\, t$ respectively, said rollers being arranged to project slightly beyond the inner surfaces of the blocks so as to engage with the vertical sides of the boards or timbers being sawed. Horizontal extensions S' and T' respectively, are provided upon the blocks S and T and these horizontal extensions are provided upon their under sides with downwardly projecting dove-tail tenons $S^2$ and $T^2$ arranged to slidingly engage with correspondingly shaped grooves or ways $s'$ and $t'$ in the upper surface of the table B. In one of these horizontal extensions as the one S', is provided a screw threaded aperture and a hand screw $s^2$ is passed therethrough and arranged to engage with the lower surface of the groove or way $s'$ to lock the guide S in its adjusted position. Adjacent to the other guide T, is preferably provided block U having a horizontal projection U', provided with a dove tail tenon $u$ adapted for engagement with the groove or way $t'$ and a hand screw $U^2$ is passed through the horizontal part of said block and adapted to engage with the bottom of the groove or way $t'$ to lock said block in its adjusted position. A spring $U^3$ is arranged between the adjacent surfaces of the blocks T and U as shown and serves to press the block T toward the block S in an obvious manner. These guide blocks are arranged at suitable distances apart to engage with the opposite sides of the boards or timbers to be sawed, and serve to feed the same accurately to the band saw but, by the yielding arrangement of the guide upon one side, I am enabled to provide for unevenness in the thickness of the boards or timbers without strain upon the guides. When these guides are not required, the set screws $s^2$ and $U^2$ may be loosened and the guides removed from the table in an obvious manner.

In order to provide for the vertical adjustment of the upper feeding disk and at the same time maintain a proper tension upon the drive chain L that actuates the same, I provide a tightener consisting preferably of an arm V pivotally supported upon the outer end of the shaft $k$ and carrying at its free end a grooved roller V' adapted for engagement with said chain, and an angular rod $v$ is arranged to extend from the lower part of the arm V and carries an adjustable weight $v'$ by means of which the arm V with roller V' is pressed upwardly against the lower side of the chain L so as to maintain the necessary tension upon said chain and at the same time permit of the vertical adjustments of the upper feeding device with the pinion L'.

As illustrated in Fig. 1, of the drawings, I also prefer to provide a lateral extension W upon the lower part of the standard M arranged to rest normally upon the top surface of the table B, and secured thereto by means of a bolt $w$. When, however, it is desired to dispense with the feeding devices so as to enable the machine to be used for scroll sawing or other work where the standard M and the parts carried thereby would be in the way, the bolt $w$ may be loosened and the standard and the mechanism carried thereby may be swung downward upon the pivotal connection $m$ so as to be out of the way, the lower feeding device being at such times lowered in the manner before described so as to carry the disk $H^2$ below the level of the table.

By my improvements, I am enabled to provide positively operating feeding devices for the work, which may be adjusted to admit of different thicknesses of work or moved entirely out of operation at will and the guides being made adjustable and also removable at will, enables me to readily change the machine for different classes of work.

My improvements may be very readily applied to any of the different forms of band sawing machines.

Having described my invention, what I claim as new and desire to secure by Letters-Patent of the United States is:

1. In a band saw feeding device, a standard and means whereby it is removably supported upon the saw table, a sliding head having a vertically adjustable engagement with said standard, a sleeve pivotally engaged with said head and carrying a revoluble shaft, a toothed disk secured upon one end of said shaft and means for imparting a rotary motion to said shaft, substantially as set forth.

2. In a band saw feeding device a standard and means whereby it is removably secured upon the top of the saw table, a sliding head having a vertically adjustable engagement with said standard, a sleeve pivotally engaged with said head and carrying a revoluble shaft, a toothed disk secured to one end of said shaft, an actuating gear secured to the other end of said shaft, an arm extending from the sliding head above said sleeve and a spring interposed between said arm and said sleeve and adapted to press downwardly upon the latter, substantially as set forth.

3. In a band saw feeding device a standard and means whereby it is removably secured upon the top of the saw table, a sliding head having a vertically adjustable engagement with said standard a sleeve pivotally engaged with said head and carrying a revoluble shaft, a toothed disk secured to one end of said shaft, an actuating gear secured to the other end of said shaft, an arm extending from the sliding head above said sleeve, a spring interposed between said arm and the sleeve and arranged to press the latter downwardly and a second arm extending from the sliding head below the sleeve and arranged to engage therewith to limit its downward movement, substantially as set forth.

4. In a band saw feeding device, a standard and means whereby it is removably secured upon the saw table a sliding head having a vertically adjustable engagement with said standard lateral lugs upon said head and a sleeve pivotally engaged between said lugs and carrying a revoluble shaft, a toothed disk secured to one end of said shaft, an actuating gear upon the other end of said shaft, an arm extending horizontally from said head at one side of the sleeve, and a link engaged with the extremity of said arm and provided at its other end with a vertical face slotted for engagement with a stud or bolt upon the side of said sleeve, substantially as set forth.

5. In a band saw feeding device, the combination with a standard and means whereby it is secured upon the top of the saw table vertical guides or ways in said standard, of a sliding head movably engaged with said ways, a screw for vertically adjusting said head, a sleeve pivotally engaged with said head and carrying a revoluble shaft, a toothed disk secured to one end of said shaft and an actuating gear secured to the other end of said shaft, an arm extending from the sliding head above the sleeve, a spring interposed between the said arm and said sleeve, an arm extending from said head below the sleeve and serving as a stop to limit the downward movement of the latter, an arm extending horizontally from said head at one side of said sleeve, and an oblique link connecting the end of said arm and the sleeve, substantially as set forth.

6. In a band saw feeding mechanism, the combination with an upper feeding device removably supported upon the saw table, of a sleeve having pivotal engagement below the table and carrying a revoluble shaft, a toothed disk secured to one end and an actuating gear secured to the other end of said shaft, a curved arm arranged adjacent to one side of said sleeve and provided with an arc shaped slot concentric with said pivotal connection a screw threaded pin upon said sleeve arranged to project through said slot, and a hand nut engaged with said pin and adapted to secure said sleeve in its adjusted position, substantially as set forth.

In testimony that I claim the foregoing I have hereunto set my hand, at Sheboygan, in the county of Sheboygan and State of Wisconsin, in the presence of two witnesses.

GEORGE P. MYERS.

Witnesses:
FRANK GOTTSACKER,
FRED ZILLIER.